(12) United States Patent
DeYoung et al.

(10) Patent No.: US 11,525,497 B2
(45) Date of Patent: Dec. 13, 2022

(54) LINEAR ACTUATING MEMBER DRIVEN BY A ROTATING HELIX

(71) Applicant: HTI Technology and Industries, Inc., La Vergne, TN (US)

(72) Inventors: Roger L. DeYoung, Franklin, TN (US); John Alan Hammar, Newtown, CT (US)

(73) Assignee: HTI TECHNOLOGY AND INDUSTRIES, INC., La Vergne, TN (US)

( * ) Notice: Subject to any disclaimer, the term of this patent is extended or adjusted under 35 U.S.C. 154(b) by 95 days.

(21) Appl. No.: 17/326,604

(22) Filed: May 21, 2021

(65) Prior Publication Data

US 2021/0364069 A1 Nov. 25, 2021

Related U.S. Application Data

(60) Provisional application No. 63/028,776, filed on May 22, 2020.

(51) Int. Cl.
*F16H 25/12* (2006.01)
*F16H 57/04* (2010.01)

(52) U.S. Cl.
CPC ....... *F16H 25/122* (2013.01); *F16H 57/0497* (2013.01)

(58) Field of Classification Search
CPC ..... F16H 25/122; F16H 25/2409; F16H 25/20
See application file for complete search history.

(56) References Cited

U.S. PATENT DOCUMENTS

| | | | | |
|---|---|---|---|---|
| 5,390,585 | A * | 2/1995 | Ryuh | F16H 25/122 92/136 |
| 2014/0311265 | A1* | 10/2014 | Duck | A61G 7/018 74/89.23 |
| 2017/0331350 | A1* | 11/2017 | Sørensen | F16H 25/2454 |
| 2019/0107127 | A1* | 4/2019 | Raymond | F15B 15/02 |
| 2019/0301501 | A1* | 10/2019 | Zhu | F16H 57/032 |
| 2021/0339654 | A1* | 11/2021 | Napau | B60N 2/067 |
| 2022/0212647 | A1* | 7/2022 | Reichert | B60T 17/08 |

* cited by examiner

*Primary Examiner* — Terence Boes
(74) *Attorney, Agent, or Firm* — Emerson, Thomson & Bennett, LLC; Roger D. Emerson (57) ABSTRACT

An actuator assembly is provided for converting rotation into linear displacement including a linear fluid dispensing tube for linear displacement. Hemispherical lugs are monolithically formed on the linear member. A primary gear includes a central bore having helix grooves formed into a surface of the central bore. The helix grooves receive the hemispherical lugs so that each helix groove mates with a respective hemispherical lug to reduce friction, so that hemispherical lugs slide smoothly within the respective helix grooves. Linear projections are formed on the exterior surface of the dispensing tube and extend longitudinally along the dispensing tube. A projecting portion has an aperture for receiving and guiding the dispensing tube through the linear displacement. Mating grooves are formed on an interior of the projecting portion for receiving and guiding the linear projections, thereby preventing the dispensing tube from rotating during travel.

12 Claims, 13 Drawing Sheets

LINEAR ACTUATING MEMBER DRIVEN BY A ROTATING HELIX

This application claims the benefit of U.S. provisional patent application Ser. No. 63/028,776, filed May 22, 2020, the entire contents of which are incorporated herein by reference.

I. BACKGROUND

A. Technical Field

This invention pertains to the field of devices that translate rotational motion into linear motion. In particular, the invention pertains to the field of devices that rotationally advance a linear member for use in fluid handling and dispensing devices.

B. Description of Related Art

There are many mechanisms that convert rotary motion into linear motion. These include connecting rods from crankshafts to pistons and lead screws from rotary power sources such as "motor to sliding" mechanisms. In the case of lead screws, the screws themselves, which are rotationally powered, have a male shaft-like helix form that linearly propels a movable component via connection through a mating female helix. More advanced forms of a linear helix system incorporate the use of balls to engage the grooves of the male helix. In all known applications of these systems, the lead screw is retained from moving in a linear motion, thus its rotational forces are transmitted to linear forced on the female helix or balls in order to propel a slide or other similar component.

II. SUMMARY

This disclosure describes a configuration for incorporating a female helix in a powered rotating component to actuate linear motion upon a member with integrated lugs that engage the helix. Further, the member has integrated anti-rotation features that preclude rotation of the member thus allowing the member to linearly travel without rotation. The lugs can be produced in forms such as hemisphere-like protrusions tapered protrusions, or rectangular protrusions to mate with the helix form in the rotating helix. The member can also have multiple patterns of these protrusions that are spaced specifically to align with the helix pitch thus extending the distance that the member can linearly travel. The spacing of these protrusions can be equal to the helix pitch or a distance of the helix pitch divided by the number of lugs or a factor of the helix pitch that allows for non-binding mating with the helix grooves. It should be noted that the rotating component must have reversible control; i.e. the helix rotates clockwise to move the linear member one direction and counterclockwise to move the linear member the opposite direction. Typically, this is accomplished with an electric DC motor.

In particular, an actuator assembly is disclosed for converting rotation into linear displacement, including a linear member configured for alternately extending and retracting linear displacement in a longitudinal direction of the linear member. In various embodiments, the linear member can be a hollow linear fluid dispensing tube or alternatively a solid member.

One or more substantially smooth hemispherical lugs are monolithically formed on an exterior surface of the linear member. A primary gear is provided including a central bore having at one or more helix grooves formed into a surface of the central bore. The one or more helix grooves receive the respective hemispherical lug so that each helix groove mates with a respective hemispherical lug, both of which are lubricated with a grease, to reduce friction within the at least one helix groove. The hemispherical lugs are monolithically molded into the body of the linear member.

In this embodiment, there are four substantially smooth and lubricated helix grooves that respectively mate with the four substantially smooth and lubricated hemispherical lugs to reduce friction within the helix grooves.

A gear housing is provided for receiving and retaining the linear member and the primary gear. One or more linear projections are formed on the exterior surface of the linear member and are extending longitudinally along a length of the linear member. The gear housing includes a projecting portion having an aperture for receiving and guiding the linear member through the alternately extending and retracting linear displacement. One or more mating grooves are formed on an interior of the projecting portion. The mating groove(s) receive and guide the linear projection(s), thereby holding the linear member rotationally stationary to prevent the linear member from rotating during the upward and downward travel.

In an exemplary embodiment, the one or more linear projection can include two linear projections formed at generally opposite sides of the exterior surface of the linear member. The one or more mating grooves can correspondingly include two mating grooves formed respectively at opposite sides of the interior of the projecting portion.

In an alternative embodiment, the one or more linear projections can include four linear projections formed along the exterior surface of the linear member. The one or more mating grooves can correspondingly include four mating grooves formed respectively corresponding positions to the linear projections on the interior of the projecting portion.

The present actuator assembly can include a motor that generates a rotation that is transmitted to the primary gear to effect the linear displacement of the linear member. A gear train can be provided that receives the rotation generated by the motor includes a suitable number and arrangement of gears to impart a desired rotation to the primary gear.

The primary gear of the present actuator assembly preferably includes gear teeth for interacting with the gear train. In one embodiment, the primary gear can include a sector having less than a complete 360 degree circumference. In another embodiment, the primary gear can optionally extend around a complete 360 degree circumference.

Other benefits and advantages of this invention will become apparent to those skilled in the art to which it pertains upon reading and understanding of the following detailed specification.

III. BRIEF DESCRIPTION OF THE DRAWINGS

The disclosed actuating member may take physical form in certain parts and arrangement of parts, embodiments of which will be described in detail in this specification and illustrated in the accompanying drawings which form a part hereof and wherein.

IV. DETAILED DESCRIPTION

Referring now to the drawings wherein the showings are for purposes of illustrating embodiments of the article only and not for purposes of limiting the same, and wherein like reference numerals are understood to refer to like components.

Figure 1:
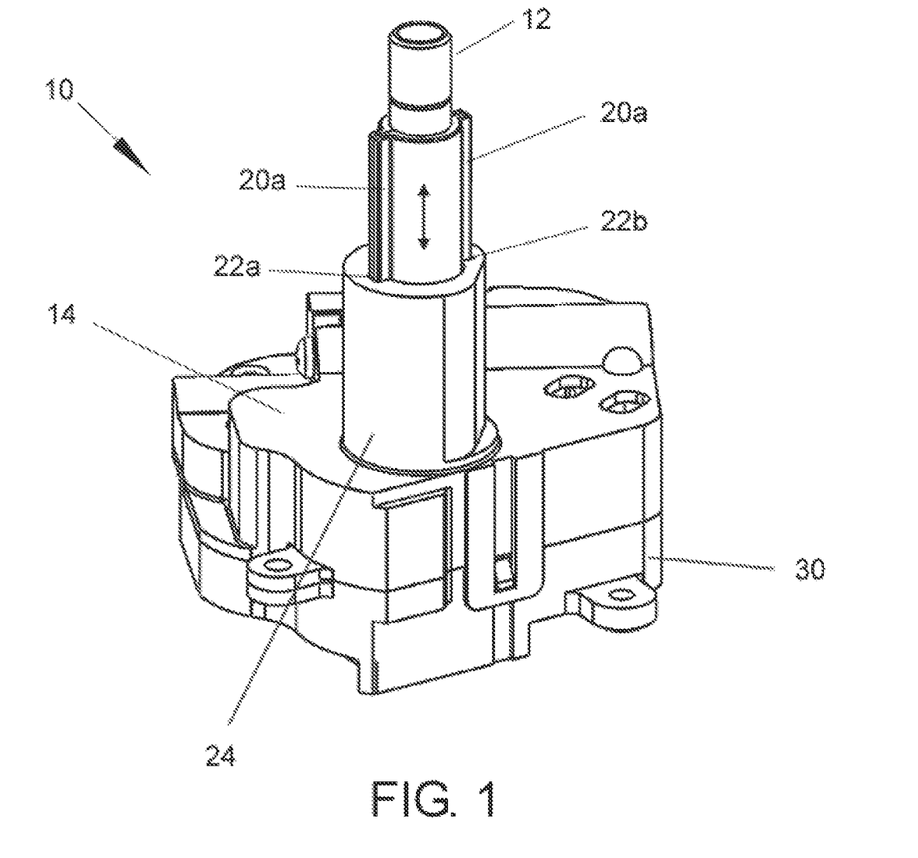
FIG. 1 is a perspective view showing a fluid dispensing tube that travels up and down and is powered by a gear motor in accordance with an exemplary embodiment of the present invention.
Figure 2:
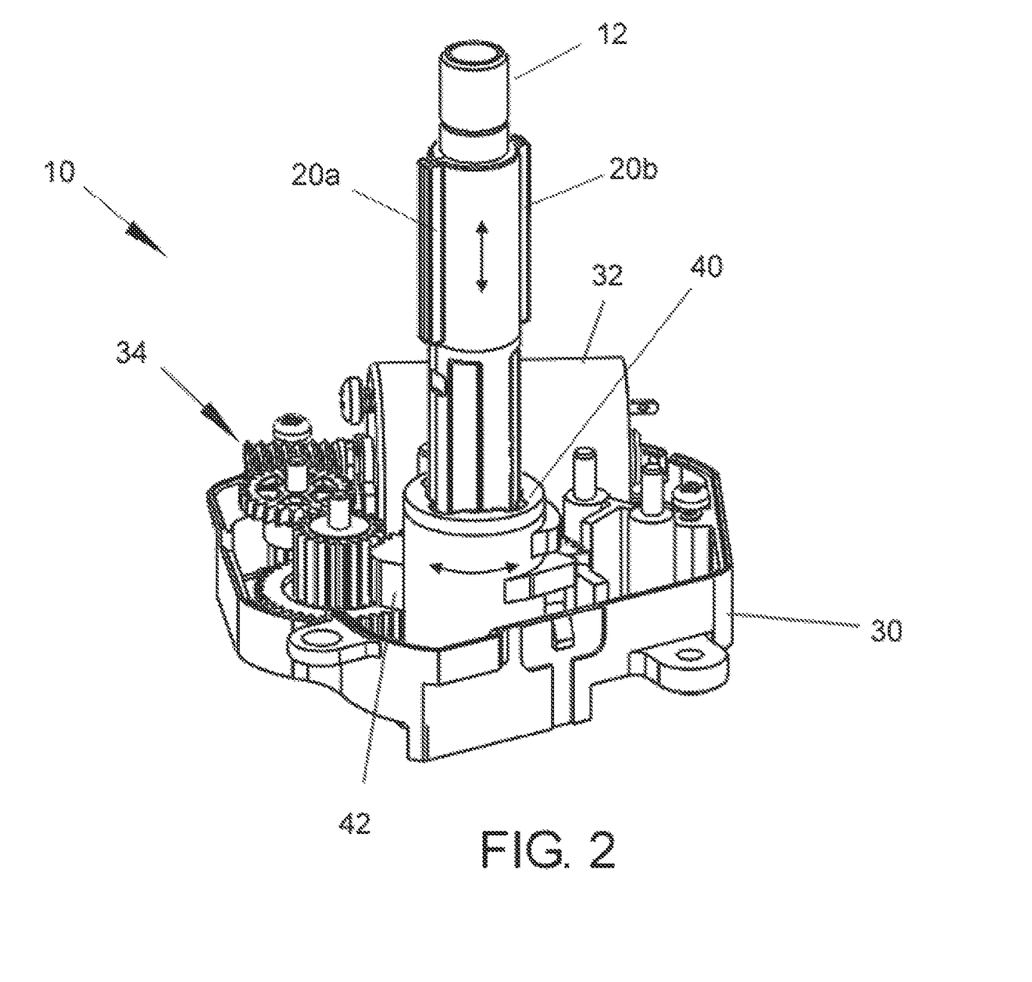
FIG. 2 is a perspective view depicting the mechanism in FIG. 1 without the gear cover to show inside components, with the dispensing tube moved to an up position, in accordance with an exemplary embodiment of the present invention.
Figure 3:
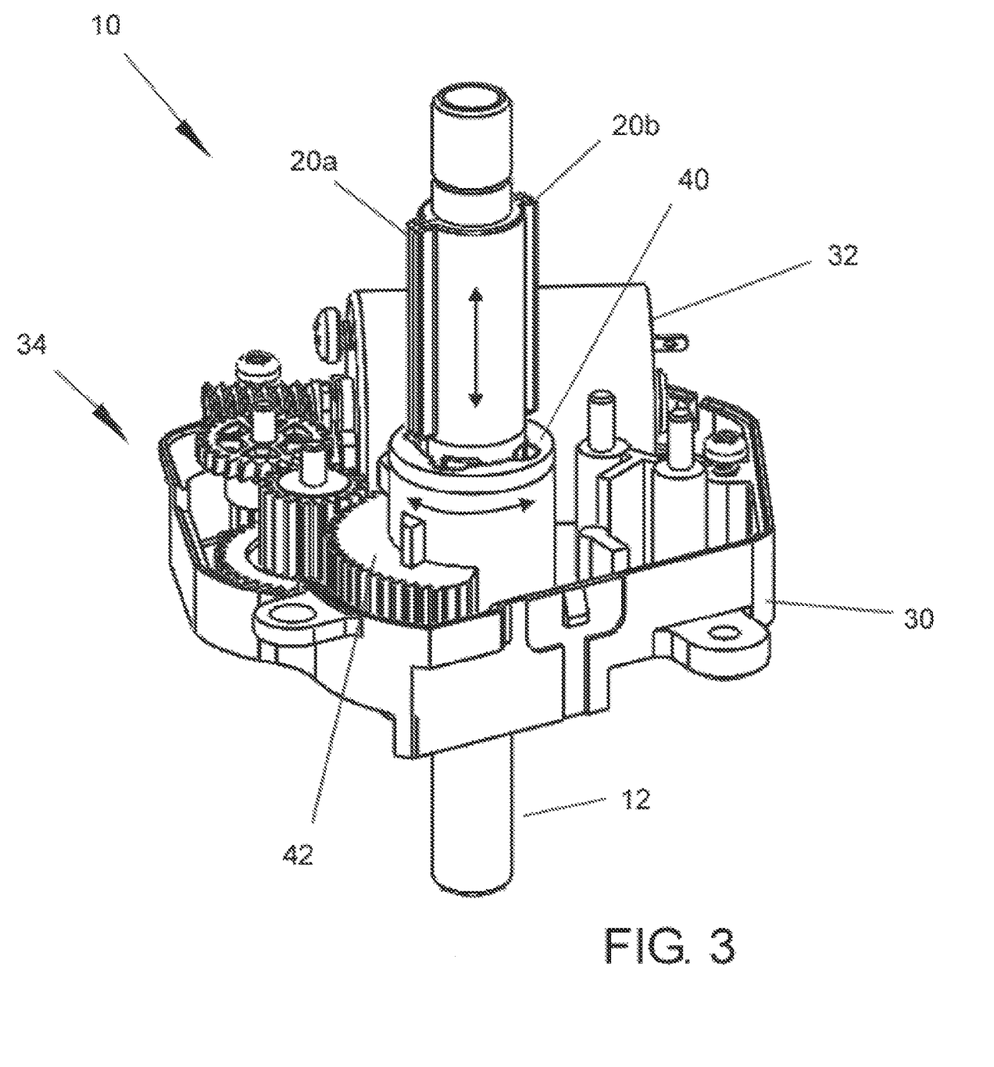
FIG. 3 is a perspective view depicting the mechanism as shown in FIG. 2, with the dispensing tube moved to the down position, in accordance with an exemplary embodiment of the present invention.

FIGS. 1-3 depict an actuator assembly 10 for converting rotation into linear displacement having a linear fluid dispensing tube 12 configured for linear displacement, for alternately extending and retracting linear displacement in a longitudinal direction, to travel up and down, as indicated by the arrow shown in these figures. The fluid dispensing tube 12 is a type of linear member, and any suitable type of linear member could be employed with this assembly 10 without departing from the invention. As shown in FIG. 1, the dispensing tube 12 is received within a gear housing 14 of the assembly 10. The dispensing tube 12 includes a pair of sliders 20a, 20b.

As shown in FIGS. 1-3, the sliders 20a, 20b are linear projections formed on the outside or exterior surface of the dispensing tube 12 at generally opposite sides of the dispensing tube 12, and extending longitudinally along the length of the dispensing tube 12. The sliders 20a, 20b, are received within respective mating grooves 22a, 22b formed on the interior of a projecting portion 24 of the gear housing 14. The mating grooves 22a, 22b are formed along the edge of an aperture into the interior of the projecting portion 24. The aperture is used for receiving and guiding the dispensing tube 12 (or other linear member) through the alternately extending and retracting linear displacement. The mating grooves 22a, 22b receive and guide the sliders 20a, 20b, thereby holding the dispensing tube 12 rotationally stationary during linear travel. Thus, the sliders 20a, 20b and the mating grooves 22a, 22b are anti-rotation features to prevent the dispensing tube 12 from turning or rotating during the upward and downward travel.

Figure 4:
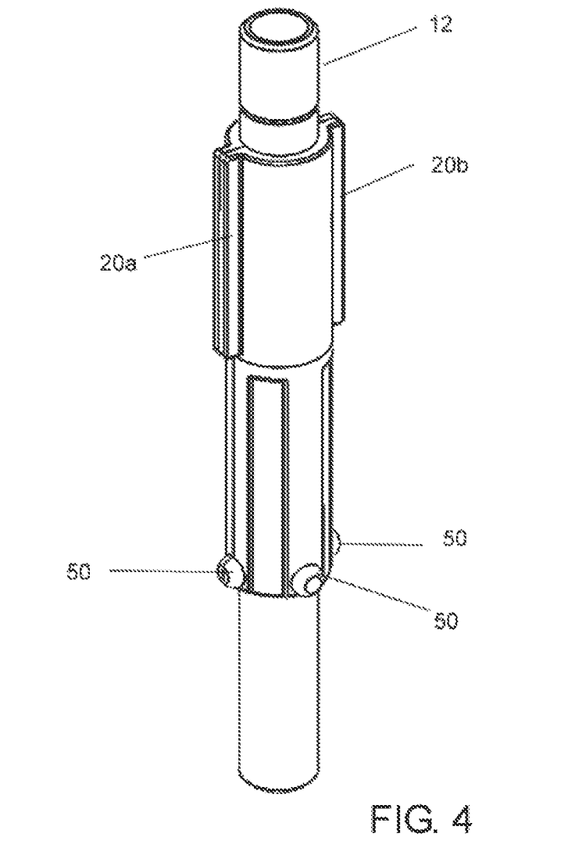
FIG. 4 is a perspective view showing the dispensing tube with anti-rotation features and hemispherical lugs in accordance with an exemplary embodiment of the present invention.
Figure 5:
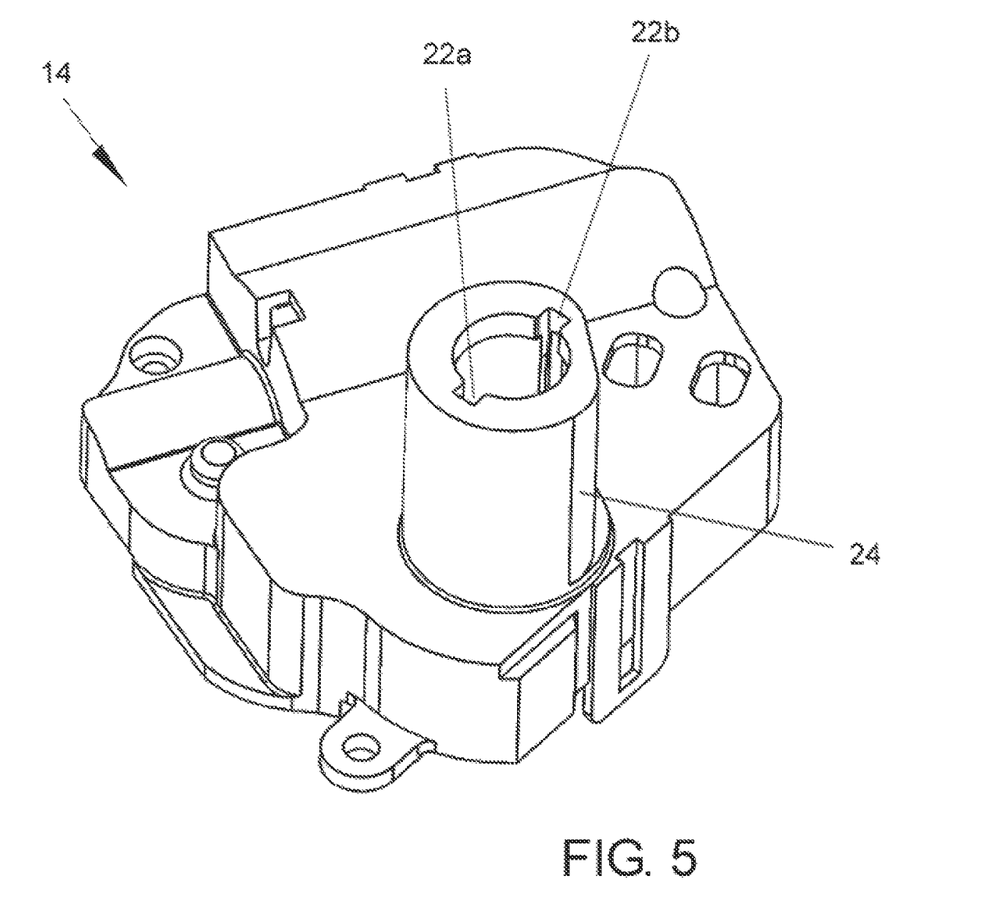
FIG. 5 is a perspective view of the gear cover with anti-rotation features in accordance with an exemplary embodiment of the present invention.

FIG. 4 specifically depicts the fluid dispensing tube 12 to more clearly show the sliders 20a, 20b and other features. FIG. 5 specifically illustrates the gear housing 14 with the projecting portion 24 and the mating grooves 22a, 22b. The gear housing 14 is used for receiving and retaining the fluid dispending tube 12 or other type of linear member, and also a primary gear, as described in detail hereinbelow.

In FIGS. 2 and 3, the gear housing 14 is removed to show the inside components and more clearly explain the operation of the assembly 10. A bottom housing 30 receives and retains the operational components, including the dispensing tube 12. A motor 32 (preferably a DC electric motor) generates a rotation that is transmitted through a gear train 34 including a suitable number and arrangement of gears to impart a desired rotation. The gear train 34 interacts with a primary gear 40 that effects the linear displacement of the dispensing tube 12.

Figure 6:
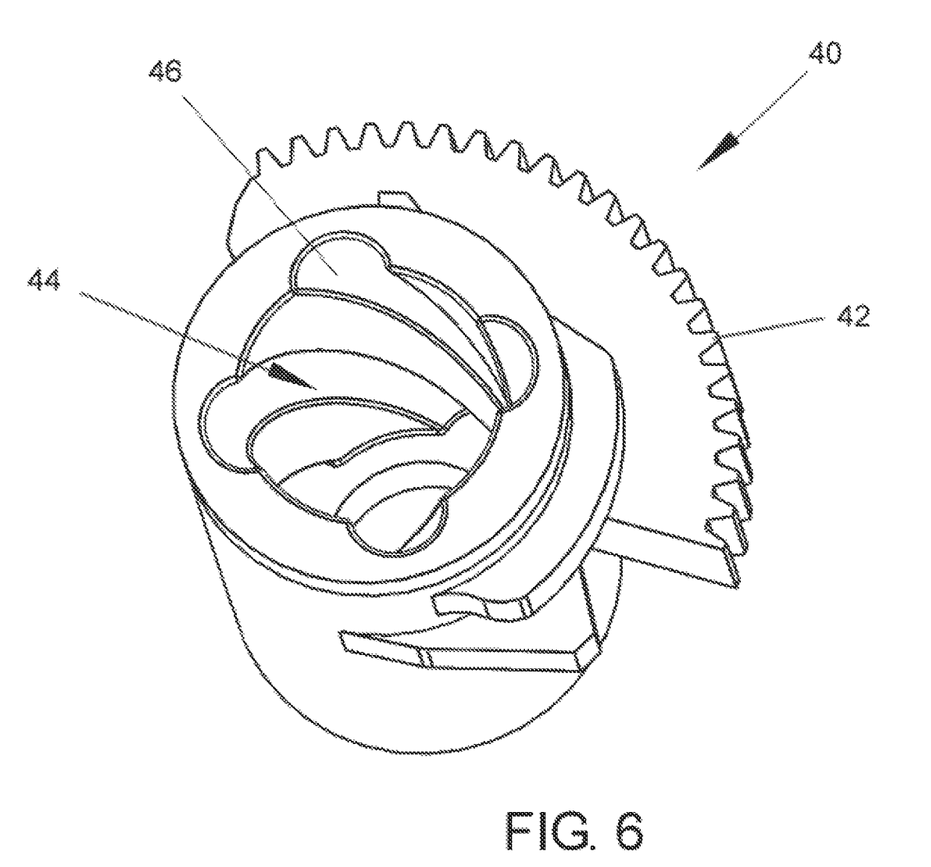
FIG. 6 is an overhead perspective view of a gear with internal helix grooves in accordance with an exemplary embodiment of the present invention.

As shown specifically in FIG. 6, the primary gear 40 includes a sector 42 having gear teeth for interacting with the gear train 34. As shown, the sector 42 is less than a complete 360 degree circumference of the primary gear 40. The primary gear 40 includes a central bore 44 having a plurality of female helix grooves 46, which are essentially helical channels formed into the surface of the central bore, on the interior of the primary gear 40. As shown, four helix grooves 46 are indicated, but any suitable number could be contemplated without departing from the invention. The helix grooves 46 receive hemispherical lugs 50, formed on the outside or exterior surface of the dispensing tube 12. The helix grooves 46 have a generally hemispherical profile so as to mate with the lugs 50. In this manner, the dispensing tube 12 is received within the central bore 44 of the primary gear 40. The substantially smooth and lubricated helix grooves 46 thereby mate with the substantially smooth and lubricated hemispherical lugs 50, which reduces friction within the helix grooves 46 and thereby enable sliding of the hemispherical lugs 50 within the helix groove 46. This facilitates movement of the dispensing tube 12 within the central bore 44 of the primary gear 40. In the preferred embodiment, the substantially smooth hemispherical lugs are monolithically molded into the body of this linear dispensing tube 12.

As shown in FIG. 2, when the sector 42 of the primary gear 40 is engaged at one end, the dispensing tube 12 is extended at an upward position. As shown in FIG. 3, a rotation of the gear train 34 results in a rotation of the primary gear 40 so that the sector 42 engages the gear train 34 at the opposite end. The rotation of the primary gear 40 causes the lugs 50 to ride within the helix grooves 44, causing the lugs 50 to respectively ascend or descend within the central bore. This movement within the central bore thereby produces linear displacement of the dispensing tube 12 with each rotation of the primary gear 40, so that the dispensing tube 12 is retracted to the downward position evident in FIG. 3. The dispensing tube 12 is restricted from rotation during linear displacement by the sliders 20a, 20b that slideably engage the mating grooves 22a, 22b in the projecting portion 24 of the gear housing 14 (FIG. 1).

Figure 7:
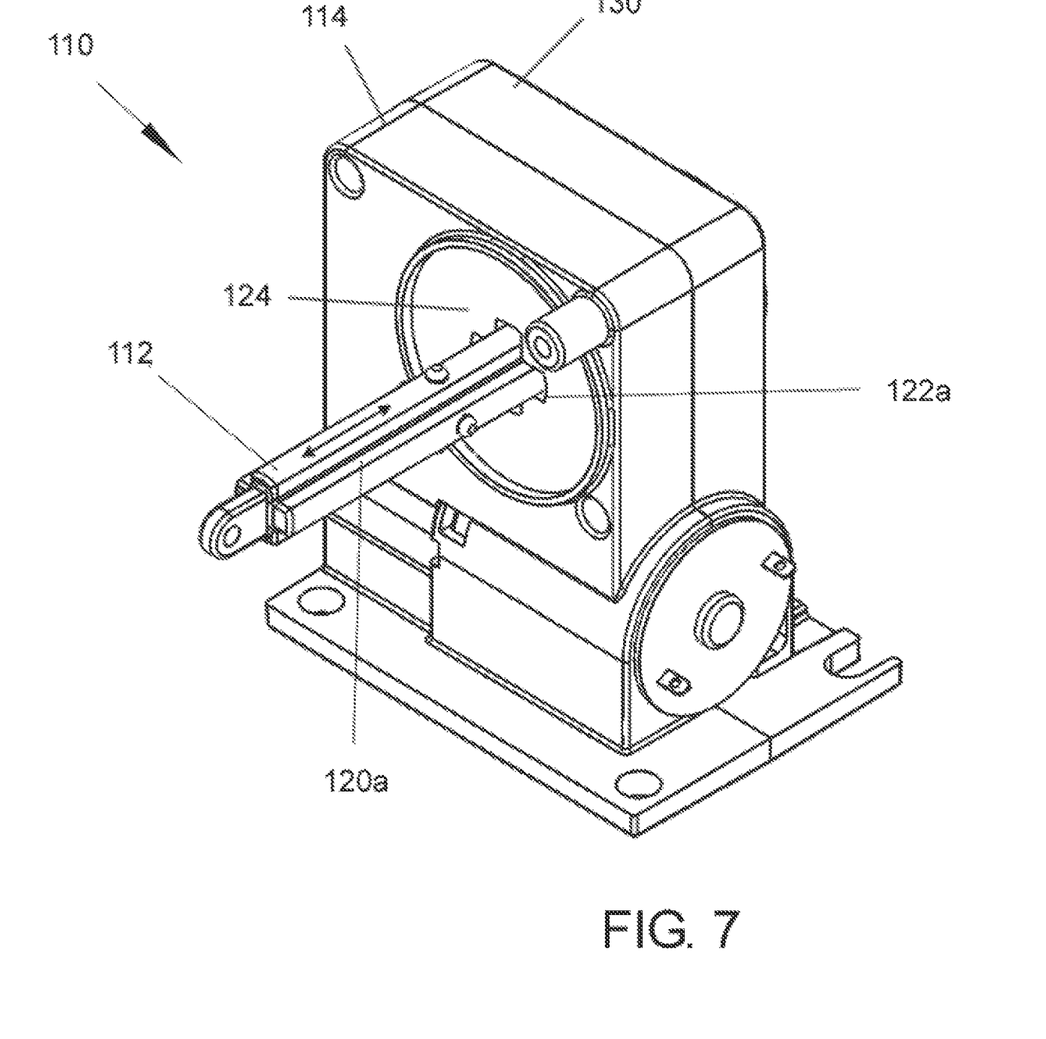
FIG. 7 is a perspective view of a linear member with patterned lugs operated by a gear motor shown in the extended position in accordance with an alternate exemplary embodiment of the present invention.
Figure 8:
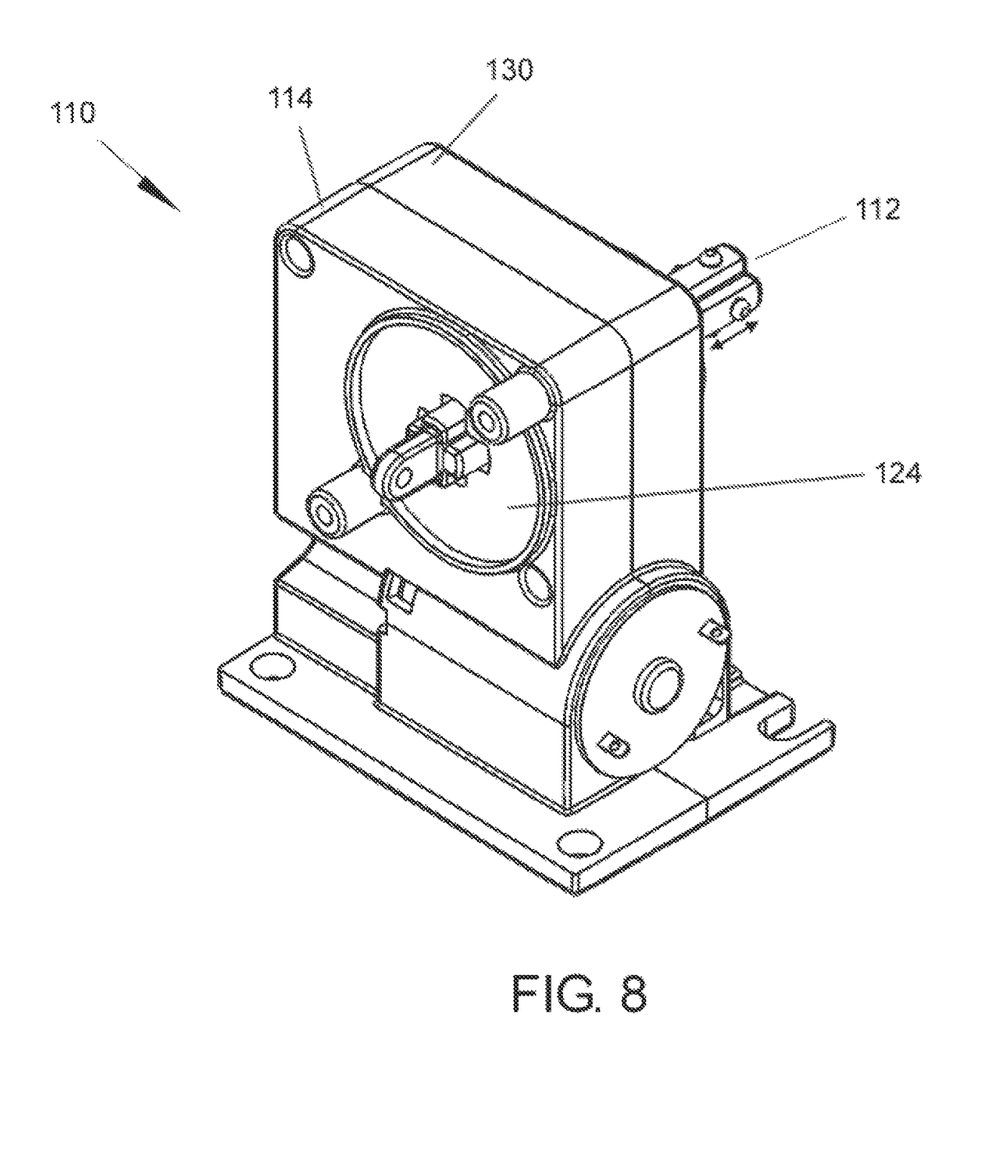
FIG. 8 is a perspective view of the mechanism of FIG. 7 in the retracted position in accordance with an alternate exemplary embodiment of the present invention.
Figure 9:
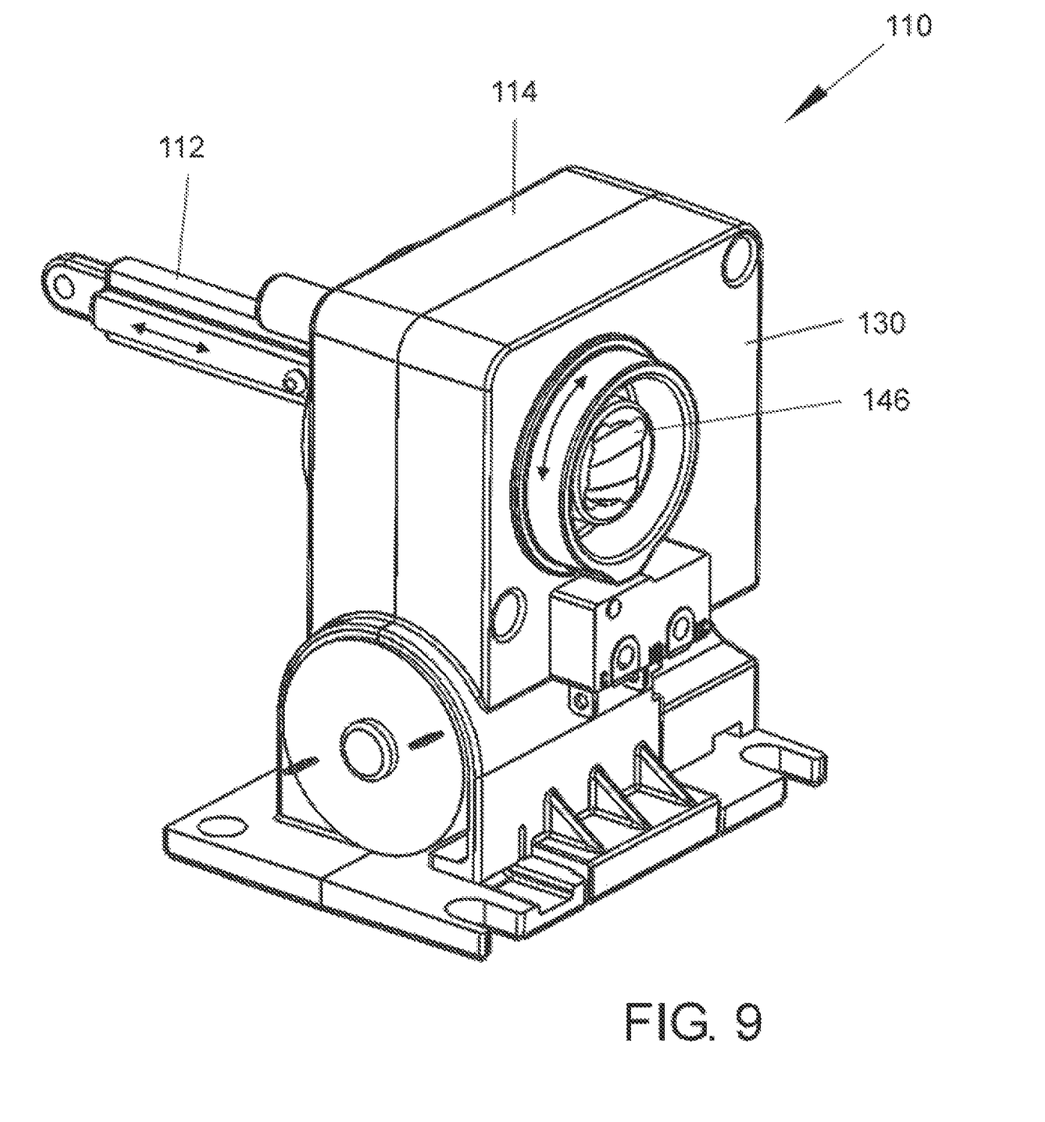
FIG. 9 is a perspective view showing the back side of the mechanism of FIG. 7 with the helix grooves in accordance with an alternate exemplary embodiment of the present invention.

An alternate embodiment of an assembly 110 is shown in FIGS. 7-13. As shown in FIG. 7, the linear member 112 with patterned lugs 150 is operated by a gear motor (not shown) and depicted in the extended position. FIG. 8 shows the assembly 110 with the linear member 112 in the retracted position. It is to be appreciated that the assembly 110 includes the gear motor and gear train (not shown) similar in structure and operation to the previous embodiment, discussed hereinabove. Such components are retained within a gear housing 114 and a base housing 130. FIG. 9 shows the back side of the assembly of FIGS. 7 and 8 revealing the female helix grooves 146 of the primary gear 140.

As shown in FIGS. 7-9, the linear member 112 is not a fluid bearing member like the dispensing tube 12 of the previous embodiment. Rather, the linear member 112 is preferably a solid member that is extended and retracted for linear displacement for any suitable purpose where such an operation may be desirable. The linear member 112 is received within the gear housing 114 of the assembly 110. The linear member 112 includes four sliders 120a, 120b, 120c, 120d. The sliders 120a, 120b, 120c, 120d are linear projections formed on the outside of the linear member 112 and extend longitudinally along the length of the linear member 112. The sliders 120a, 120b, 120c, 120d are received within respective mating grooves 122a, 122b, 122c, 122d formed on the interior of a circular surface 124 of the gear housing 114. The sliders 120a, 120b, 120c, 120d and the mating grooves 122a, 122b, 122c, 122d are anti-rotation features to prevent the linear member 112 from turning during the linear travel.

Figure 10:
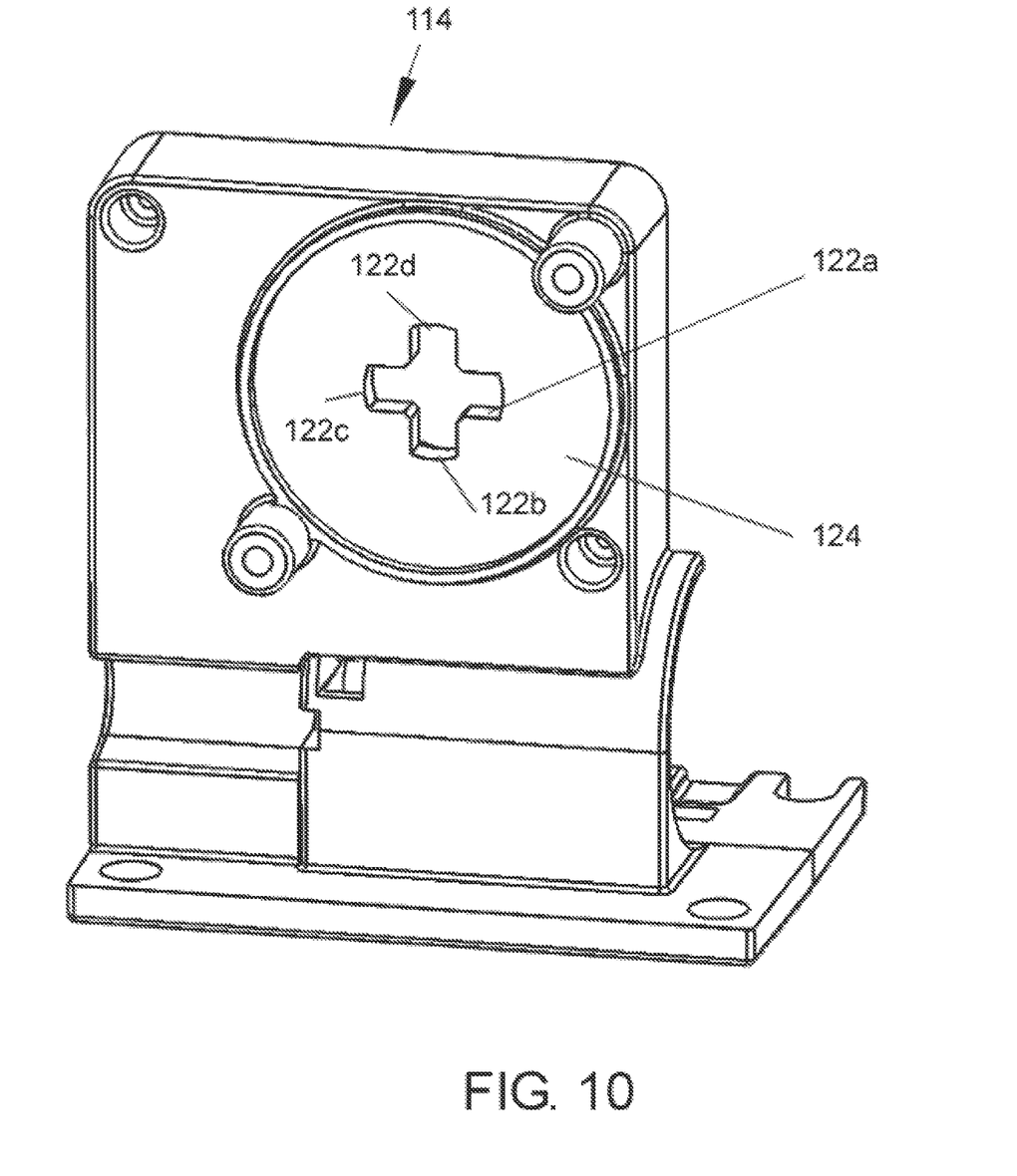
FIG. 10 is a perspective view of the gear cover of the mechanism of FIG. 7 with anti-rotation grooves in accordance with an alternate exemplary embodiment of the present invention.
Figure 11:
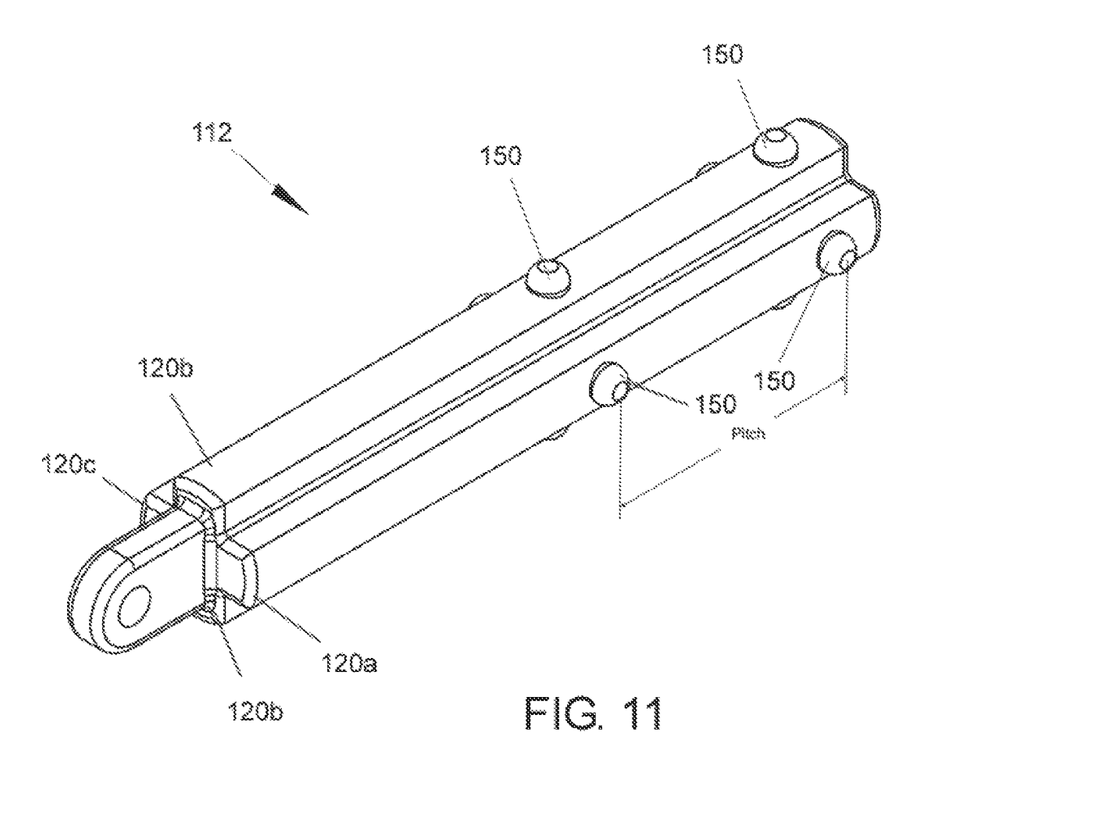
FIG. 11 is a perspective view of the linear member with patterned hemispherical lugs in accordance with an alternate exemplary embodiment of the present invention.

FIG. 10 specifically illustrates the gear housing 114 with the mating grooves 122a, 122b, 122c, 122d. FIG. 11 specifically depicts the linear member 112 to more clearly show the sliders 120a, 120b, 120c, 120d and the patterned substantially smooth hemispherical lugs 150. The spacing of these lugs 150 is preferably equal to the helix pitch of the helix grooves 146 of the primary gear 140. Alternatively, the spacing of the lugs 150 can be a distance of the helix pitch of the helix grooves 146 divided by the number of lugs or a factor of the helix pitch that allows for non-binding mating with the helix grooves. The spacing of the lugs 150 extends the distance that the linear member 112 can linearly travel, and provides mechanical stability of the linear member 112 while moving through the helix grooves 146 of the primary gear 140.

Figure 12:
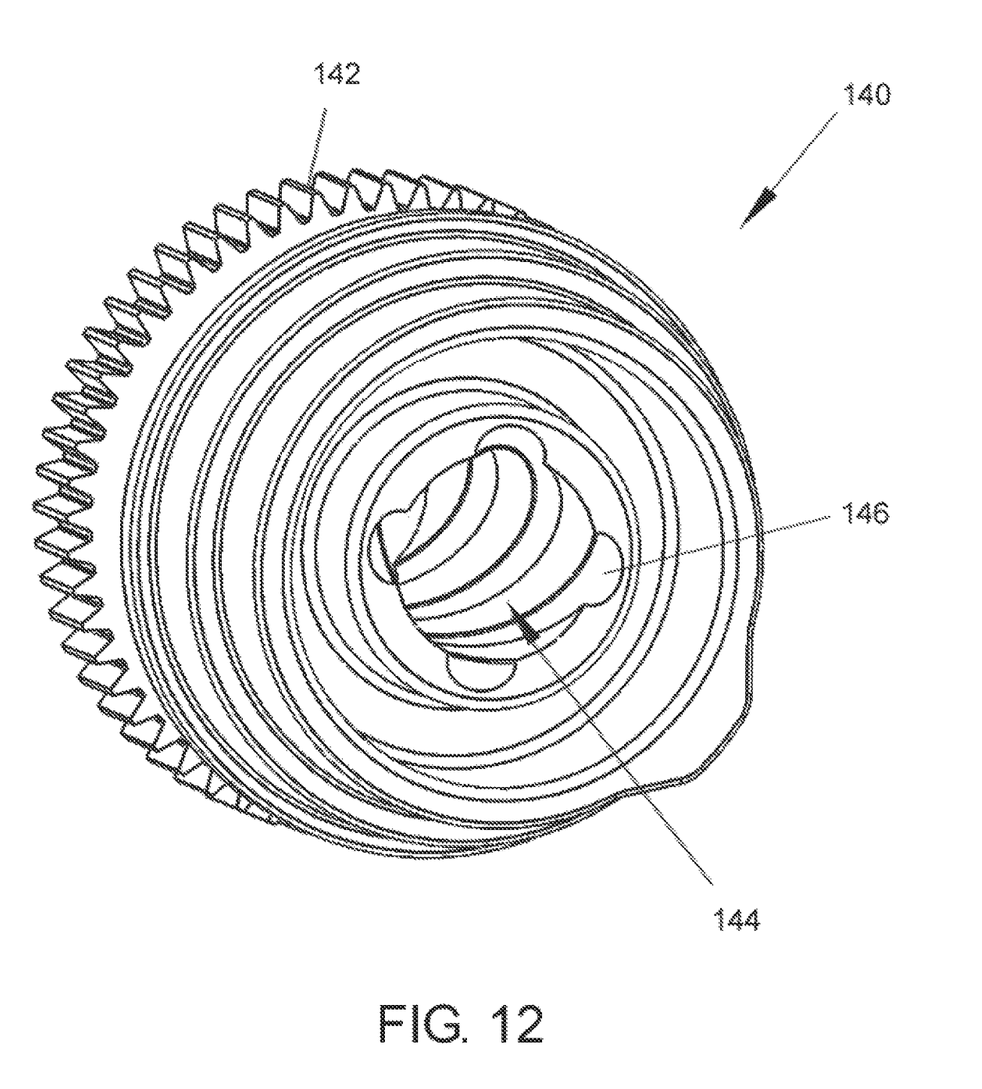
FIG. 12 is a perspective view shows a gear with internal helix grooves in accordance with an alternate exemplary embodiment of the present invention.
Figure 13:
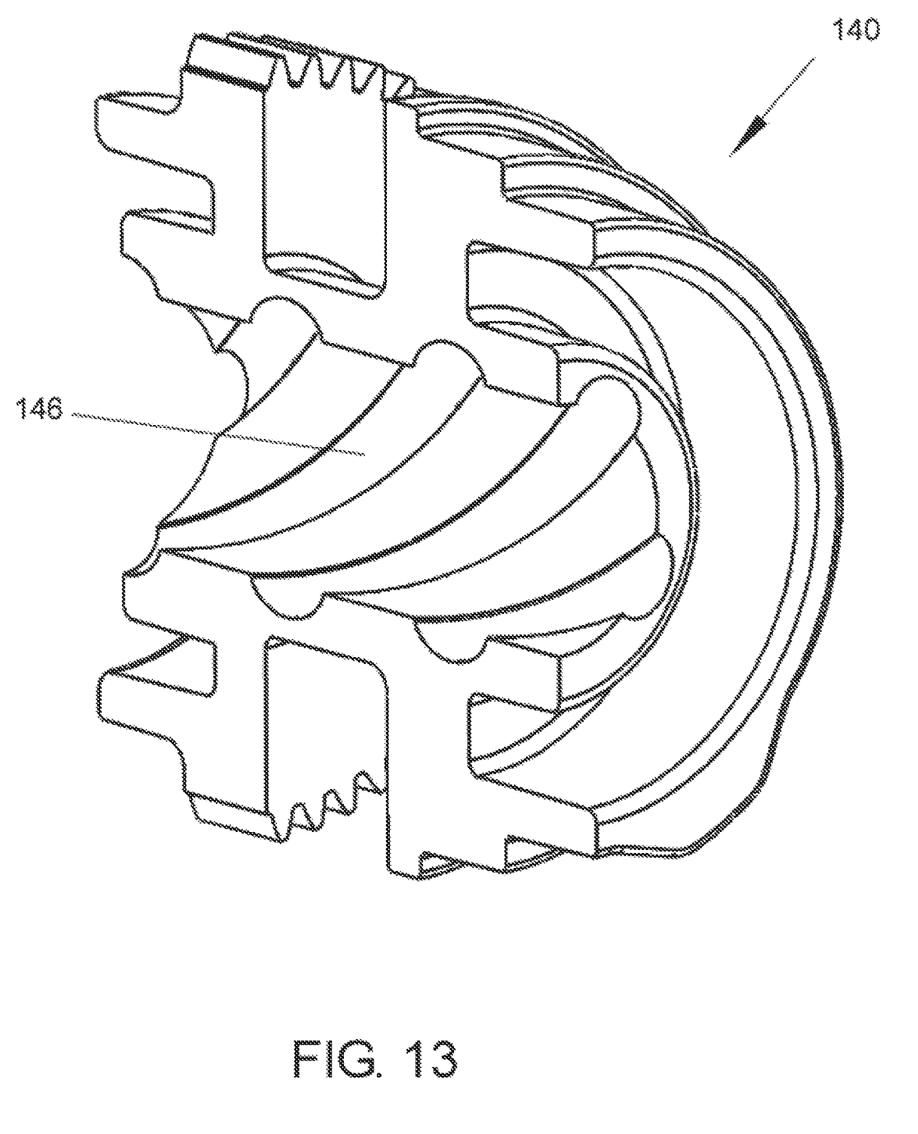
FIG. 13 is a perspective a cutaway section of the gear with helix grooves of FIG. 12 in accordance with an alternate exemplary embodiment of the present invention.

As shown specifically in FIGS. 12 and 13, the primary gear 140 includes a gear 142 having gear teeth for interacting with the gear train. As shown, the sector 142 of this alternate embodiment includes a complete 360 degree circumference of the primary gear 140. The primary gear 140 includes a central bore 144 having a plurality of female helix grooves 146, which are essentially helical channels formed into the central bore, on the interior of the primary gear 140. As shown, four helix grooves 146 are indicated, but any suitable number could be contemplated without departing from the invention. The helix grooves 146 receive the patterned hemispherical lugs 150, and stably support the linear member 112 during extension and retraction. The helix grooves 146 have a generally hemispherical profile so as to mate with the lugs 150. In this manner, the linear member 112 is received within the central bore 144 of the primary gear 140. The substantially smooth and lubricated helix grooves 146 thereby mate with the substantially smooth and lubricated hemispherical lugs 150, which reduces friction within the helix grooves 146. In the preferred embodiment, the substantially smooth hemispherical lugs 150 are monolithically molded into the body of this linear member 112. Further, in this preferred embodiment, the molded material used in the helix and the linear member are engineered polymers with inherent hard surfaces and lubricious characteristics.

With the embodiment of FIGS. 7-13, the gear 142 of the primary gear 140 engages the linear member 112 while extended according to FIG. 7. As shown in FIG. 8, a rotation of the gear train within the gear housing 114 results in a rotation of the primary gear 140 so that the gear 142 engages the gear train at a different position. The rotation of the primary gear 140 causes the lugs 150 to ride within the helix grooves 144, thereby producing linear displacement of the linear member 112, so that the linear member 112 is retracted to the downward position evident in FIG. 8. The linear member 112 is restricted from rotation during linear displacement by the sliders 120a, 120b, 120c, 120d that slideably engage the mating grooves 122a, 122b, 122c, 122d in the circular surface 124 of the gear housing 114.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. An actuator assembly for converting rotation into linear displacement, comprising:
   a linear member configured for alternately extending and retracting linear displacement in a longitudinal direction of the linear member;
   at least one substantially smooth and lubricated hemispherical lug formed on an exterior surface of the linear member, wherein the at least one hemispherical lug receives and retains a respective at least one ball bearing;
   a primary gear including a central bore having at least one helix groove formed into a surface of the central bore, wherein the at least one helix groove receives the respective at least one substantially smooth and lubricated hemispherical lug so that the at least one helix groove mates with the at least one hemispherical lug to reduce friction within the at least one helix groove and thereby enable sliding of the hemispherical lug within the at least one helix groove;
   a gear housing for receiving and retaining the linear member and the primary gear;
   at least one linear projection formed on the exterior surface of the linear member and extending longitudinally along a length of the linear member;
   a projecting portion of the gear housing having an aperture for receiving and guiding the linear member through the alternately extending and retracting linear displacement; and
   at least one mating groove, formed on an interior of the projecting portion, wherein the at least one mating groove receives and guides the at least one linear projection, thereby holding the linear member rotationally stationary to prevent the linear member from rotating during the upward and downward travel.

2. The actuator assembly of claim 1, wherein the linear member is one of a hollow linear fluid dispensing tube or a solid member.

3. The actuator assembly of claim 1, wherein the at least one linear projection comprises two linear projections formed at generally opposite sides of the exterior surface of the linear member, wherein the at least one mating groove comprises two mating grooves formed respectively at opposite sides of the interior of the projecting portion.

4. The actuator assembly of claim 1, wherein the at least one linear projection comprises four linear projections formed along the exterior surface of the linear member, wherein the at least one mating groove comprises four mating grooves formed respectively corresponding positions to the linear projections on the interior of the projecting portion.

5. The actuator assembly of claim 1, further comprising a motor that generates a rotation that is transmitted to the primary gear to effect the linear displacement of the linear member.

6. The actuator assembly of claim 5, further comprising a gear train that receives the rotation generated by the motor includes a suitable number and arrangement of gears to impart a desired rotation to the primary gear.

7. The actuator assembly of claim 6, wherein the primary gear includes gear teeth for interacting with the gear train.

8. The actuator assembly of claim 1, wherein the primary gear includes a sector having less than a complete 360 degree circumference.

9. The actuator assembly of claim 1, wherein the primary gear extends around a complete 360 degree circumference.

10. The actuator assembly of claim 1, wherein the at least one hemispherical lug comprises four substantially smooth and lubricated hemispherical lugs monolithically formed on the exterior surface of the linear member, for respectively receiving and retaining four ball bearings, and wherein the at least one helix groove comprises four helix grooves that respectively mate with the four substantially smooth and lubricated hemispherical lugs to reduce friction within the four substantially smooth and lubricated helix grooves.

11. An actuator assembly for converting rotation into linear displacement, comprising:
 a hollow linear fluid dispensing tube configured for alternately extending and retracting linear displacement in a longitudinal direction of the dispensing tube;
 a plurality of hemispherical lugs formed on an exterior surface of the dispensing tube;
 a primary gear including a central bore having a plurality of helix grooves formed into a surface of the central bore, wherein the plurality of helix grooves receive the respective plurality of substantially smooth and lubricated hemispherical lugs to reduce friction within each substantially smooth and lubricated helix groove and thereby enable sliding of the hemispherical lugs within the respective helix grooves;
 a gear housing for receiving and retaining the dispensing tube and the primary gear;
 first and second linear projections formed on the exterior surface of the dispensing tube and extending longitudinally along a length of the dispensing tube;
 a projecting portion of the gear housing having an aperture for receiving and guiding the dispensing tube through the alternately extending and retracting linear displacement; and
 first and second mating grooves, formed on an interior of the projecting portion, wherein the first and second mating grooves receive and guide the respective first and second linear projections, thereby holding the dispensing tube rotationally stationary to prevent the dispensing tube from rotating during the upward and downward travel.

12. An actuator assembly for converting rotation into linear displacement, comprising:
 a hollow linear fluid dispensing tube configured for alternately extending and retracting linear displacement in a longitudinal direction of the dispensing tube;
 a plurality of hemispherical lugs monolithically formed on an exterior surface of the dispensing tube;
 a primary gear including a central bore having a plurality of helix grooves formed into a surface of the central bore, wherein the plurality of helix grooves receive the respective plurality of substantially smooth and lubricated hemispherical lugs so that the each helix groove mates with a respective hemispherical lug to reduce friction within each helix groove;
 a gear housing for receiving and retaining the dispensing tube and the primary gear;
 first and second linear projections formed on the exterior surface of the dispensing tube and extending longitudinally along a length of the dispensing tube;
 a projecting portion of the gear housing having an aperture for receiving and guiding the dispensing tube through the alternately extending and retracting linear displacement;
 first and second mating grooves, formed on an interior of the projecting portion, wherein the first and second mating grooves receive and guide the respective first and second linear projections, thereby holding the dispensing tube rotationally stationary to prevent the dispensing tube from rotating during the upward and downward travel;
 a motor that generates a rotation that is transmitted to the primary gear to effect the linear displacement of the dispensing tube;
 a gear train that receives the rotation generated by the motor includes a suitable number and arrangement of gears to impart a desired rotation to the primary gear, wherein the primary gear includes gear teeth for interacting with the gear train.

\* \* \* \* \*